United States Patent
Hardy et al.

(10) Patent No.: US 8,154,840 B2
(45) Date of Patent: Apr. 10, 2012

(54) FUEL INJECTOR CONTROL

(75) Inventors: Martin Paul Hardy, Gillingham (GB); Adrian R. Tolliday, Chatham (GB)

(73) Assignee: Delphi Technologies Holding S.arl, Troy, MI (US)

( * ) Notice: Subject to any disclaimer, the term of this patent is extended or adjusted under 35 U.S.C. 154(b) by 373 days.

(21) Appl. No.: 12/469,270

(22) Filed: May 20, 2009

(65) Prior Publication Data

US 2009/0294550 A1    Dec. 3, 2009

(30) Foreign Application Priority Data

May 27, 2008  (EP) .................................. 08155989

(51) Int. Cl.
*H01H 9/00* (2006.01)
(52) U.S. Cl. ........................................ 361/139; 361/160
(58) Field of Classification Search .................. 361/139, 361/144, 160; 123/494, 498
See application file for complete search history.

(56) References Cited

U.S. PATENT DOCUMENTS

| 2007/0240685 A1 | 10/2007 | Beilharz |
| 2007/0290573 A1* | 12/2007 | Sykes et al. ................... 310/311 |
| 2009/0090333 A1* | 4/2009 | Spadafora et al. ............ 123/494 |

FOREIGN PATENT DOCUMENTS

| DE | 19636088 | 3/1998 |
| DE | 19714607 | 10/1998 |
| DE | 19921456 | 11/2000 |
| DE | 10158553 | 6/2002 |
| DE | 102004026250 | 2/2005 |
| DE | 10 2005 046 933 | 9/2005 |
| EP | 1127626 | 8/2001 |
| EP | 1445459 | 8/2004 |
| EP | 1895133 | 3/2008 |
| WO | 2005/061876 | 7/2005 |

OTHER PUBLICATIONS

European Search Report dated Oct. 16, 2008.
European Search Report dated Nov. 6, 2009.

* cited by examiner

*Primary Examiner* — Danny Nguyen
(74) *Attorney, Agent, or Firm* — Thomas N. Twomey (57) ABSTRACT

A method for controlling the displacement of a stack of a piezoelectric actuator adapted for use in a fuel injector in order to control the fuel injection rate and volume. The method comprises driving a varying current through the stack during an opening phase including a first opening stage and a second opening stage; driving the stack during the first opening stage with a first opening current level for a first opening time period and driving the stack during the second opening stage with a second opening current level for a second opening time period. The second opening current level is less than the first opening current level and the current levels are selected so that the fuel injection rate in the opening phase includes a first portion corresponding to the first opening stage having a gradient that is steeper than a second portion corresponding to the second opening stage.

16 Claims, 7 Drawing Sheets

FUEL INJECTOR CONTROL

TECHNICAL FIELD

The invention relates to a method of operating a fuel injector. More specifically, the invention relates to a method of operating a piezoelectrically actuated fuel injector in order to reduce combustion noise and emissions.

BACKGROUND OF THE INVENTION

In contemporary internal combustion engine technology, it is known to deliver fuel into the cylinders of the engine by means of a fuel injector associated with each cylinder. One such type of fuel injector that permits precise metering of fuel is a so-called 'piezoelectric injector'.

Fuel injectors are favoured over alternative fuel delivery techniques, such as carburettors, since they enable a high degree of control over the volume of fuel that is injected into an associated cylinder on each combustion cycle. Such a high degree of control is extremely important in today's world in view of the increasingly stringent environmental regulations to which engine and vehicle manufactures must adhere.

Typically, a piezoelectric injector includes a piezoelectric actuator that is operable to control an injection nozzle. One such piezoelectric fuel injector is described in European patent no. EP0995901. The injection nozzle houses an injector valve needle which is movable relative to a valve needle seat under the control of the actuator. A hydraulic amplifier is situated between the actuator and the needle such that axial movement of the actuator causes an amplified axial movement of the needle. Depending on the voltage applied to the piezoelectric actuator, the valve needle is either caused to disengage the valve seat, in which case fuel is delivered into the associated engine cylinder through a set of outlets provided in a tip of the nozzle, or is caused to engage the valve seat, in which case fuel delivery is prevented.

An injector drive voltage is applied to the actuator to control an injection event comprising one or more pilot injections, a main injection, and one or more post injections depending on an operating strategy which controls the volume and timing of fuel delivery in accordance with the engine demands. The injector drive voltage is controlled by an engine control unit.

It has been observed that, using known injector control methods, there is minimal control afforded over the rate at which pressurised fuel is delivered to the combustion space. For example, it may be desirable to slow the rate at which the injection nozzle opens since this is beneficial in terms of exhaust emissions and combustion noise at some engine conditions. However, with known control techniques, this comes at the expense of an increase in particulate emissions from the exhaust.

SUMMARY OF THE INVENTION

It is against this background that the invention provides, in a first aspect, a method for controlling the displacement of a stack of a piezoelectric actuator adapted for use in a fuel injector to control a rate of injection of fuel from the injector, the method comprising driving a varying current through the stack (i.e. adding charge to or removing charge from the stack) during an opening phase including a first opening stage and a second opening stage. The method further includes driving the stack during the first opening stage with a first current level for a first time period and driving the stack during the second opening stage with a second current level for a second time period. The second current level is less than the first current level and the current levels are selected so that the injection rate in the opening phase includes a first portion corresponding to the first opening stage having a gradient that is steeper than a second portion corresponding to the second opening stage.

The invention achieves the advantage that, since two activating current levels are employed, a high current level can be applied to the actuator during the first stage of operation followed by a relatively low current for the second stage of operation. The actuator is therefore caused to exert a high initial force on its associated valve needle during the first opening stage, and this causes the valve needle to lift from its seat rapidly. Following this, the actuator applies a reduced force to the valve needle during the second opening stage which slows needle opening. Thus, the injection rate has a high initial rate of injection (opening), followed by a slower rate of injection. A high initial force is important since the valve needle is lifted quickly which minimises the start of injection delay. However, the invention recognises that following the short initial movement of the valve needle, it can be beneficial to slow the valve needle movement down significantly during some engine operating conditions. Therefore, by driving a lower current through the actuator during the second stage, the injection rate of the injector can be shaped as desired in order to optimise the combustion process for exhaust emissions and noise.

The invention applies equally to a closing phase of the injector including a first closing stage and a second closing stage, wherein the stack is driven during the first closing stage with a first current level for a first time period and is driven during the second closing stage with a second current level for a second time period. In the closing phase, the second current level is greater than the first current level and the current levels are selected so that the injection rate in the closing phase includes a first portion corresponding to the first closing stage having a gradient that is less steep than a second portion corresponding to the second closing stage.

Although in the main embodiment, the end of the first opening stage is followed immediately by the start of the second opening stage, this need not be the case and, in another embodiment, there is a delay between the first and second stages. Likewise, there may also be a delay introduced between the end of the first closing stage and the start of the second closing stage.

In one embodiment, instead of being equal time periods, the second opening time period is configured to be longer than the first opening time period. Configuring the second opening time period in this way may provide additional efficiency benefits in terms of stack power consumption since the high driving current is only utilised for a relatively short time before switching to a relatively low driving current.

Although the invention is envisaged for use within a discharge to inject fuel injector, it is also suitable for use in a charge to inject injector.

In a further aspect, a method for controlling the displacement of a stack of a piezoelectric actuator adapted for use in a fuel injector in order to control the fuel injection rate and volume, comprises causing a varying current to be driven into or out of the stack to charge or discharge the stack, respectively, during an opening and/or a closing phase, the opening phase and/or the closing phase including a first stage and a second stage. The method further includes driving the stack during the first stage with a first current level for a first time period that is less than or equal to a predetermined injection rate threshold value and driving the stack during the second stage with a second current level for a second time period, the second current level being less than the first current level.

In one embodiment, the predetermined injection rate threshold value is selected such that the injection rate reached during the first stage is less than 60% of a peak injection rate value of the injector. Preferably the injection rate threshold value is between 30 and 60 percent and, more preferably, between 45 and 55 percent, and between 48 and 52 percent, respectively. Most preferably, the predetermined injection rate threshold value is selected to be substantially 50 percent of the peak injection rate of the injector since this value had been identified as being particularly beneficial in practice.

Alternatively, the predetermined injection rate threshold value may be selected as a function of the pressure of fuel that is supplied to the injector from, for example, a high pressure fuel accumulator volume, or "rail".

Optionally, in circumstances in which the fuel demanded by an injection event results in a maximum fuel injection rate of less than the injection rate threshold value, the second time period is substantially equal to zero.

In another aspect of the invention, the invention provides a computer program product having at least one computer program software portion which, when executed in an executing environment, is operable to implement either of the methods defined above.

The invention also resides in a data storage medium having the or each software portion as previously defined, and a controller having the data storage medium as previously defined stored thereon.

In another aspect, the invention resides in a method for controlling the displacement of a stack of a piezoelectric actuator adapted for use in a fuel injector in order to control the fuel injection rate and volume, the method comprising driving a varying current through the stack during an opening phase, driving a varying current through the stack during a closing phase including a first closing stage and a second closing stage, wherein the stack is driven during the first closing stage with a first closing current level for a first closing time period and is driven during the second closing stage with a second closing current level for a second closing time period. The second closing current level is greater than the first closing current level and the current levels are selected so that the injection rate in the closing phase includes a first portion corresponding to the first closing stage having a gradient that is less steep than a second portion corresponding to the second closing stage.

In another aspect, the invention resides in a method for controlling the displacement of a stack of a piezoelectric actuator adapted for use in a fuel injector in order to control the fuel injection rate and volume, the method comprising driving a varying current through the stack during an opening phase including a first opening stage and a second opening stage, driving the stack during the first opening stage with a first opening current level for a first opening time period and driving the stack during the second opening stage with a second opening current level for a second opening time period. The second opening current level is less than the first opening current level and wherein, during the first stage, the stack is driven such that the first opening time period is less than or equal to a predetermined injection rate threshold value.

In one embodiment, the predetermined injection rate threshold value is selected such that the injection rate reached during the first stage is less than 60% of a peak injection rate value of the injector. Preferably the injection rate threshold value is between 30 and 60 percent and, more preferably, between 45 and 55 percent, and between 48 and 52 percent, respectively. Most preferably, the predetermined injection rate threshold value is selected to be substantially 50 percent of the peak injection rate of the injector since this value had been identified as being particularly beneficial in practice.

BRIEF DESCRIPTION OF THE DRAWINGS

In order that the invention may be more readily understood reference will now be made, by way of example only, to the following drawings in which:

FIG. 6a is a graph of current versus time showing a single discharge stage;

FIG. 6b is a graph of stack voltage versus time according to FIG. 6a;

FIG. 6c is a graph of injection rate versus time according to FIGS. 6a and 6b;

FIG. 7b is a graph of stack voltage versus time according to FIG. 7a; and

DETAILED DESCRIPTION OF THE EMBODIMENTS

Figure 1:
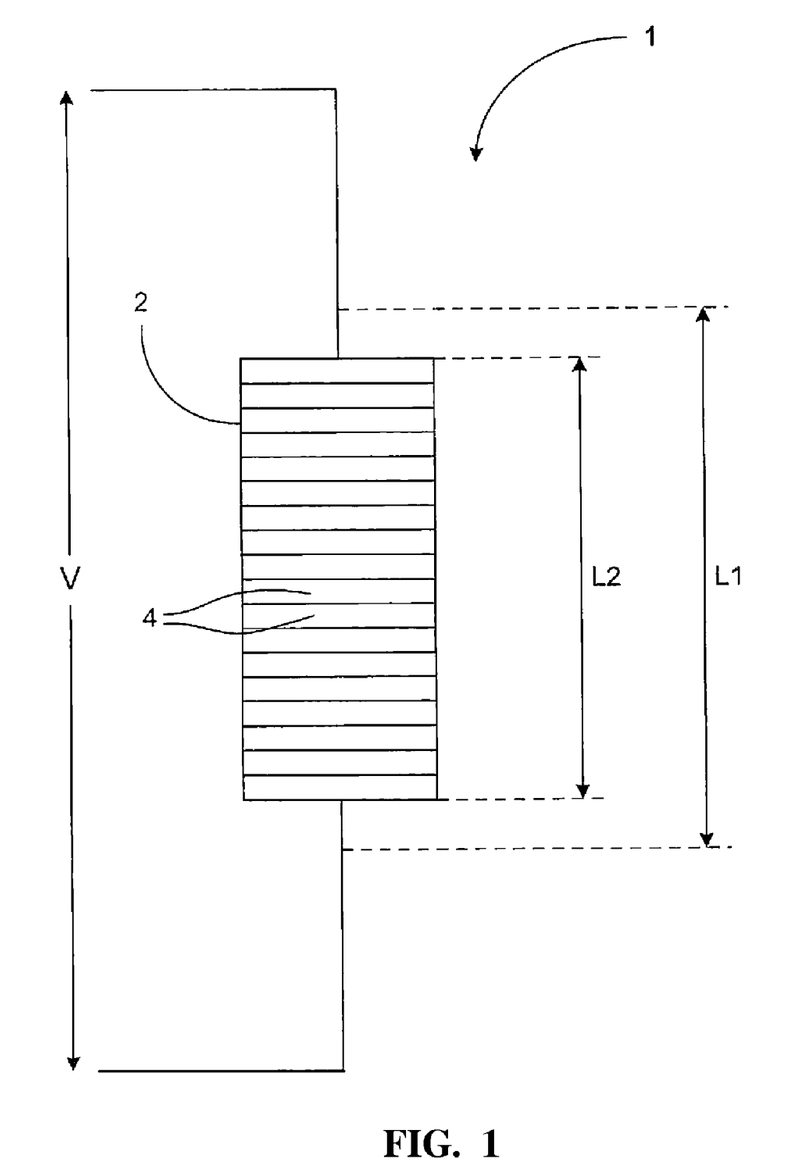
FIG. 1 is a schematic diagram of a piezoelectric actuator, including a stack of piezoelectric elements, with which the method of the present invention may be used.

FIG. 1 shows a schematic diagram of a piezoelectric actuator 1 including a stack 2 of capacitive piezoelectric elements 4, which are effectively connected in parallel. The actuator is of the type suitable for use in a fuel injector of the type described in EP 1174615 having a valve needle which is operable by means of the actuator 1.

The stack 2 is charged to different energisation levels by driving a current I into or out of the stack 2 for a given time t, in accordance with the relationship below:

Charge($Q$)=Current($I$)×time($t$).

FIG. 2($a$) shows a typical graph of charge versus time for an actuator 1, which is driven from a closed non-injecting position to an open injecting position (i.e. an opening/discharging phase 6) and back again to the non-injecting position (i.e. a closing/charging phase 8). During the opening phase 6 the charge changes from a first charge level Q1 to a second charge level Q2 over a time $t_{open}$. The difference between Q1 and Q2 equals a change in charge ΔQ, which corresponds to the length of the stack 2 changing from a relatively long length L1 to a relatively short length L2, as shown in FIG. 1. The change in length of the stack 2 directly controls movement of an injector valve needle, and hence controls fuel delivery.

Figure 2A:
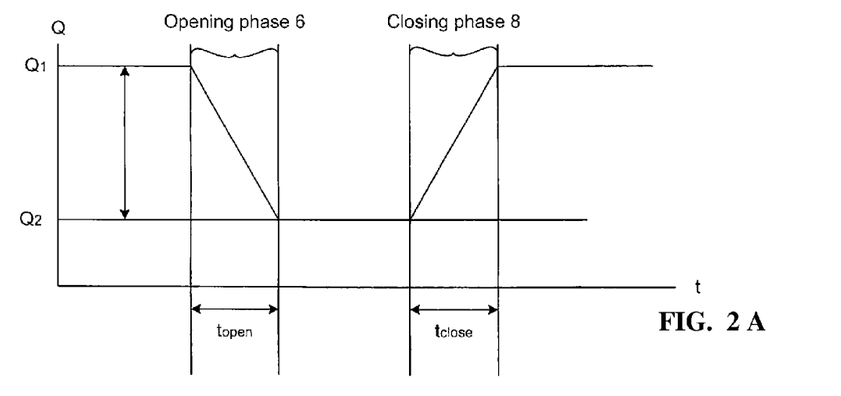
FIG. 2 includes idealised graphs of (a) charge versus time, (b) current versus time, (c) a discharge enable signal, (d) a charge enable signal, and (e) a chopped current control signal, for opening and closing phases of a fuel injector having a piezoelectric actuator as in FIG. 1.
Figure 2B:
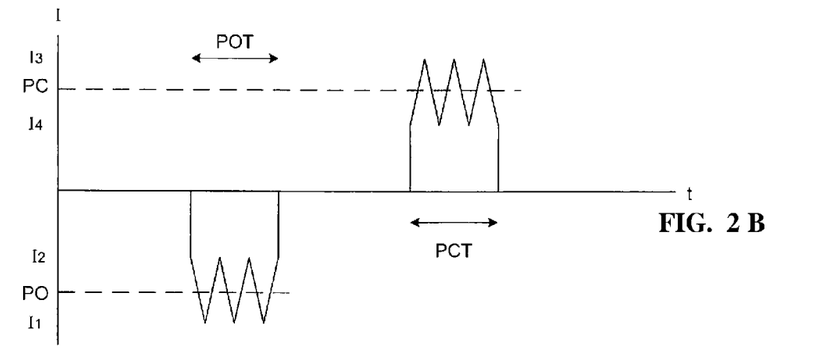

The aforementioned method of controlling a piezoelectric actuator 1 is referred to as a "charge control" method. It is possible to operate an actuator using this method by determining how much charge is to be applied to/removed from the stack, and applying/removing an appropriate current to or from the stack 2 for the required time in accordance with the equation above. In practice a varying current, that is to say a current that transitions between two current levels, is used for charging and discharging the stack. The mean value of the current is known, and will be referred to as the "current set point" or "current level". FIG. 2(b) also shows a typical graph of current versus time for a varying current (the mean value/set point is shown by the dashed line) that is applied to the stack 2 in order to achieve the charge waveform shown in FIG. 2(a).

Figure 3:
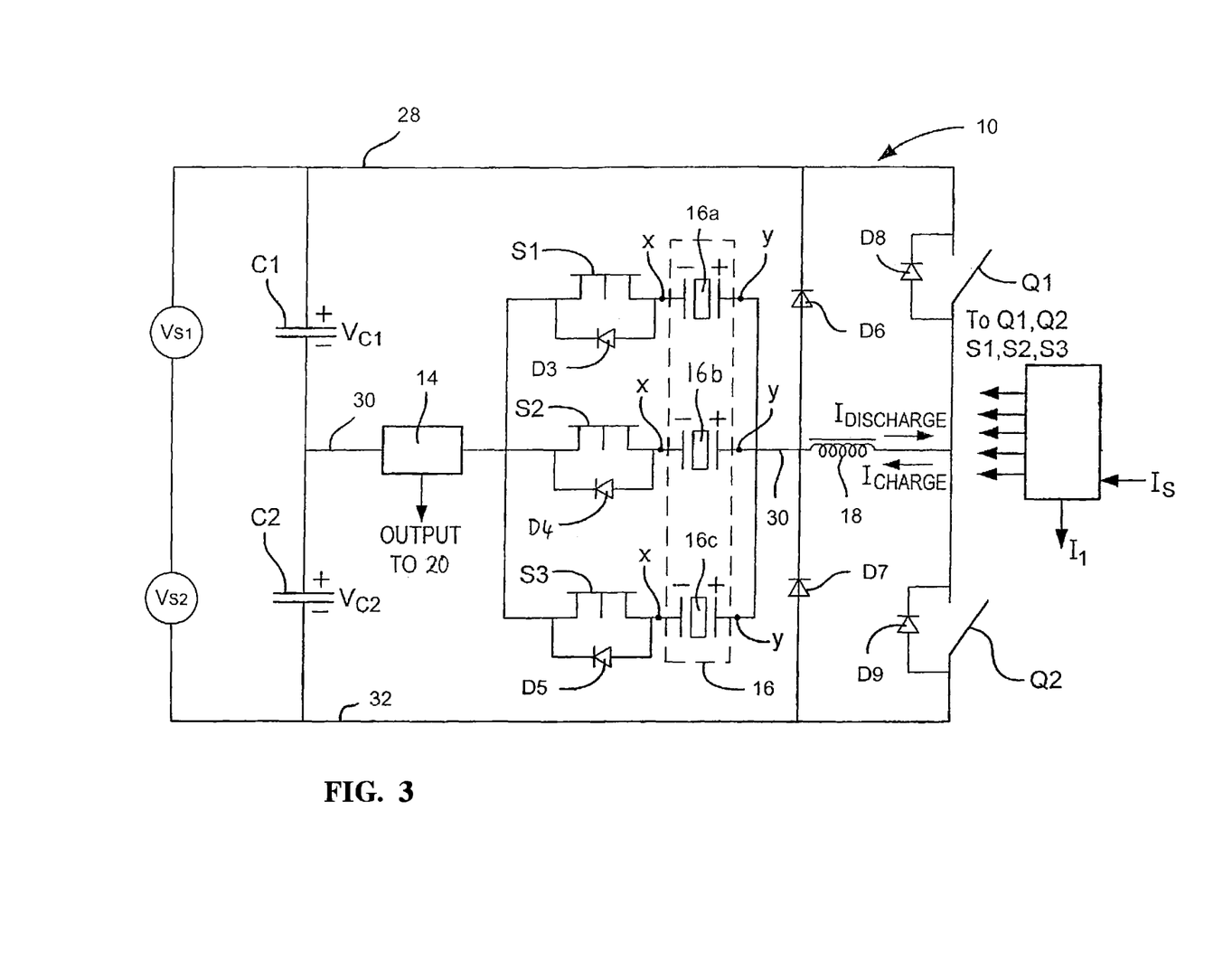
FIG. 3 is a circuit diagram of a drive circuit for implementing the method of the present invention.

Referring to FIG. 3, a drive circuit 10 is arranged to drive an injector bank 16 comprising first, second and third injectors 16a, 16b, 16c respectively, each of which includes an actuator as shown in FIG. 1. The drive circuit includes a first voltage source $V_{S1}$, a second voltage source $V_{S2}$, first and second energy storage capacitors C1 and C2, a current flow sensing and control means 14, injector select switches S1, S2, S3, each of which is associated with a respective one of the injectors 16a, 16b, 16c, an inductor 18, a charge switch Q1, a discharge switch Q2, and a microprocessor 20. Each of the injector select switches S1, S2, S3 typically takes the form of an insulated gate bipolar transistor (IGBT) having a gate coupled to a gate drive which is powered at a bias supply input. The charge and discharge switches Q1, Q2 may take the form of an n-channel IGBT having a gate controlling current flow from the collector to the emitter.

The first voltage supply $V_{S1}$ is connected across a top voltage rail 28, which is at a top voltage level $V_{top}$, and a middle voltage rail known as a bi-directional middle current path 30, which is at a stack voltage level $V_{Stack}$. The second voltage supply $V_{S2}$ is connected across the middle voltage rail 30 and a bottom voltage rail 32 which is at a bottom voltage level $V_{bottom}$.

The first energy storage capacitor C1 is connected between the top voltage rail 28 and the middle current path 30, and the second storage capacitor C2 is connected between the middle current path 30 and bottom voltage rail 32. The current flow sensing and control means 14 is connected in the middle current path 30, between a connection point between the first and second storage capacitors C1, C2 and the injector bank 16.

The injectors 16a, 16b, 16c are connected in parallel, each injector 16a, 16b, 16c being connected in a different parallel branch and each branch including an injector select switch S1, S2, S3, which has a diode D3, D4, D5 connected across it. The injectors 16a, 16b, 16c are mounted remotely from the drive circuit 10, and connections x and y are provided, to the drive circuit 10, through appropriate connecting leads.

The negative terminals of each of the injectors 16a, 16b, 16c are connected to their respective select switches S1, S2, S3. The positive terminals of the injectors 16a, 16b, 16c are connected together, and coupled in series to the inductor 18.

A diode D6 is provided between the middle current path 30 on the injector side of the inductor 18 and the top voltage rail 28, and another diode D7 is provided between the bottom voltage rail 32 and the middle current path 30, again, on the injector side of the inductor 18. The diode D6 provides a 'voltage clamping effect' for a selected injector 16a, 16b, 16c at the end of its charge phase 8, and prevents the injector 16a, 16b, 16c from being driven to voltages higher than $V_{C1}$. The diode D7 provides a recirculation path for current flow during the discharge phase 6 of operation, as described in further detail below.

The charge switch Q1 is connected between the non-injector side of the inductor 18 and the top voltage rail 28, and a diode D8 is connected in parallel across it. Likewise, the discharge switch Q2 is connected between the bottom voltage rail 32 and the non-injector side of the inductor 18, and similarly, a diode D9 is connected in parallel across it.

Figure 2C:
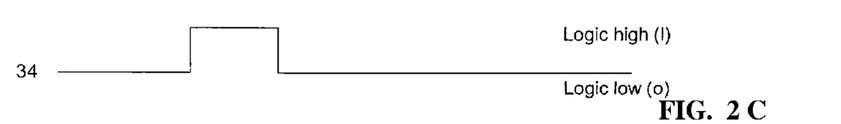
Figure 2D:
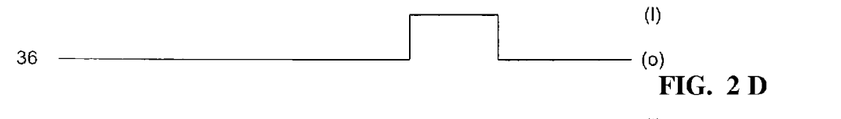
Figure 2E:
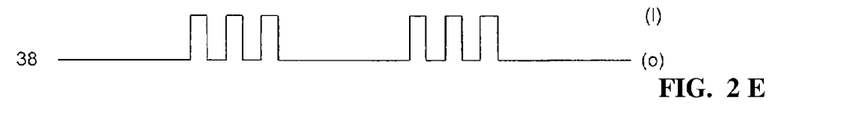

The output $I_S$ of the current flow sensing and control means 14 is fed into an input of the microprocessor 20, which provides control signals for the current flow sensing and control means 14, the injector select switches S1, S2, S3, the charge switch Q1, and the discharge switch Q2. The control signals for the discharge and charge switches Q2, Q1 are referred to as a discharge enable signal 34 and a charge enable signal 36, respectively, as shown in FIGS. 2(c) and 2(d) respectively.

By controlling the injector select switches S1, S2, S3, the charge switch Q1, and the discharge switch Q2, it is possible to drive a varying current through the stack 2, for the required time, such that the stack 2 is charged/discharged, and fuel delivery is controlled accordingly.

Referring also to FIG. 2(b), 2(c), 2(d) and 2(e), the current is caused to vary between an upper current threshold level $I_1$ and a lower current threshold level $I_2$ under the control of the current sensing and control means 14 in conjunction with the microprocessor 20. The current sensing and control means 14 monitors the current flow and generates a chopped signal 38 (FIG. 2(e)) on the basis of the 'sensed' current $I_S$. This will be described in further detail below. The chopped signal 38 is combined with the discharge enable signal 34 (FIG. 2(c)) through a logical AND gate, and the resultant signal is applied to the discharge switch Q2. The chopped signal 38 is also combined with the charge enable signal 36 (FIG. 2(d)) through a logical AND gate, and that resultant signal is applied to the charge switch Q1. The discharge switch Q2 opens and closes to generate the varying current signal in the discharge phase 6. In the charge phase 8, it is the charge switch Q1 that controls generation of the varying current.

Values for a primary opening current set point PO, a primary opening time POT, and a primary closing current set point PC are stored in look-up tables within the memory of the microprocessor. The microprocessor 20 selects the value of the primary opening current set point PO, the primary opening time POT, and the primary closing time set point PC depending on stack pressure, stack temperature, and a demanded injector on time TON (which is determined from the fuel demand and is also a function of the fuel rail pressure). The drive circuit 10, and hence fuel delivery, are controlled by an engine control module (ECM). The ECM incorporates strategies to determine the required fuelling and timing of injection pulses based on the current engine operating conditions, including torque, engine speed and operating temperature. The timing of when the injectors open and close is determined by the ECM and is not essential to the understanding of the present invention. It should be appreciated at this point that the microprocessor could be a separate component to the ECM or integral therewith.

During the discharge phase 6, the value for the primary opening current set point PO is converted by the microprocessor 20 into a corresponding upper current threshold level $I_1$. While it is possible for the microprocessor 20 to generate both the upper and lower current threshold levels $I_1$, $I_2$, in practice it is simpler to generate just the upper current threshold level $I_1$, and use a potential divider to generate the lower current threshold level $I_2$ as a fixed proportion of the upper current threshold level $I_1$. Similarly during the charge phase 8, the microprocessor 20 generates an upper current threshold level $I_3$ corresponding to the primary closing current set point PC. Likewise, for the charging phase, the potential divider is arranged to generate a lower current threshold $I_4$. The microprocessor 20 outputs one upper current threshold level $I_1$, $I_3$ at a time.

The required upper current threshold level $I_1$ is output from the microprocessor 20 to the current sensing and control means 14 at the appropriate time depending on the injection timing according to the ECM and the selected primary opening time POT. In other words, for the duration of the primary opening time POT, the upper current threshold level $I_1$ corresponding to the primary opening current set point PO is output from the microprocessor 20. In a similar manner, during the charge phase, the upper current threshold level $I_3$ corresponding to the primary closing current set point PC is output from the microprocessor 20 for the duration of a determined primary closing time PCT. The primary closing time PCT is determined such that the amount of charge removed during the opening/discharge phase 6 is re-applied during the closing/charge phase 8, depending on the primary closing current set point PC derived from the look-up tables.

The upper and lower current threshold levels $I_1$, $I_2$, $I_3$, $I_4$ are such that the mean current produced meets the primary opening current set point PO and the primary closing current set point PC. It is to be appreciated that it is more convenient to refer to the mean current since it is this current, and the time that it is applied for, which determines the amount of charge applied to or removed from the actuator. The upper current threshold levels $I_1$, $I_3$ and the lower current threshold levels $I_2$, $I_4$ produced by the potential divider determine the limits of current variation.

To inject with a particular injector 16a, 16b, or 16c the select switch S1, S2, S3 for that injector is activated (closed), by the microprocessor 20. For example, referring to FIG. 4, if it is required to inject with the first injector 16a, the select switch S1 is closed. The other two injector select switches S2, S3 of the bank remain de-activated at this time as the second and third injectors 16b, 16c with which they are associated are not required to inject.

In addition, the discharge enable signal 34 goes from a logic low to a logic high. The current sensing and control means 14 initially outputs a logic high signal, and this and the high discharge enable signal 34 causes the discharge switch Q2 to close. Current is allowed to flow from the voltage supply $V_{S2}$ across the second capacitor C2, through the current sensing and control means 14, through the selected switch (S1 in this example), and into the corresponding negative side of the selected injector (16a in this example). The discharge current $I_{DISCHARGE}$ (shown as the solid line in FIG. 4) flows from the injector 16a, through the inductor 18, through the closed switch Q2 and back to the negative terminal of the second capacitor C2. As the select switches S2 and S3 remain open, and due to the direction of their associated diodes, D4 and D5 respectively, substantially no current is able to flow through the second and third injectors 16b, 16c.

The current sensing and control means 14 monitors the current flow through the middle current path 30 as it builds up and, as soon as the upper current threshold level $I_1$ is reached, the output from the current sensing and control means 14 switches from a logic high to a logic low causing de-activation (opening) of the discharge switch Q2. At this point, the energy that is built up in the inductor 18 recirculates through the diode D8 associated with the charge (open) switch Q1. As a consequence, the direction of current flow through the inductor 18 and the selected one of the injectors 16a does not change. This is a "recirculation phase" of the discharge phase 6 of operation of the drive circuit 10. The recirculation discharge current is shown as the dashed line 42 in FIG. 4.

Figure 4:
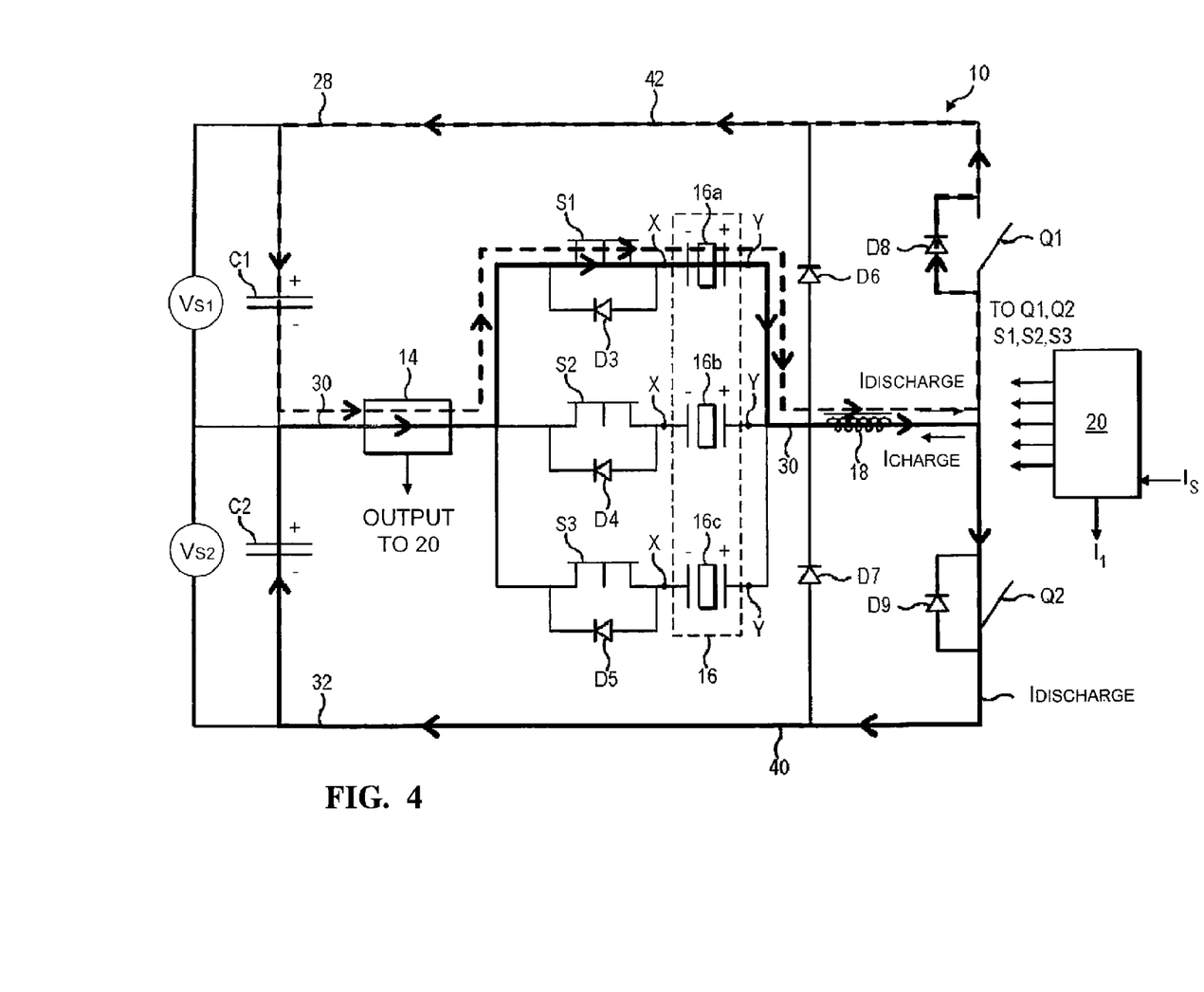
FIG. 4 is the circuit diagram of FIG. 3 showing the current paths around the drive circuit during a discharge phase.

During the recirculation phase, current flows from the negative side of the first voltage source $V_{S1}$ across the first capacitor C1, through the current sensing and control means 14, through the selected injector select switch S1, through the selected injector 16a, through the inductor 18, and finally through the diode D8 and into the positive side of the first capacitor C1. Thus, energy from the inductor 18 and the selected one of the injectors 16a is transferred to the first capacitor C1 during the recirculation phase for energy storage purposes. The current sensing and control means 14 monitors the recirculation current, so that when the recirculation current has fallen below the lower current threshold level (i.e. the recirculation current threshold) $I_2$, the current sensing and control means 14 generates a signal to reactivate the discharge switch Q2 to continue the discharge operation.

The varying current is driven through the stack 2 until the primary opening time POT expires. In this discharge phase 6, the second capacitor C2 provides energy, while the first capacitor C1 receives energy for storage. At the end of the primary opening time POT, the discharge switch Q2 and the select switch S1 of the injector 16a are deactivated.

It is desirable that the injector select switch S1 is deactivated before the discharge switch Q2 because the rate at which the current decays depends solely on the inductor 18: without deselecting the injector select switch S1 first, the current would decay slowly (which rate depending on the electrical time constant of the stack) resulting in more charge than intended being removed from the stack 2. By deselecting the injector select switch S1 first, the current is forced to zero much quicker, and the additional charge removed is minimal. Where the discharge switch Q2 is deactivated substantially simultaneously or soon after the injector select switch S1, the diode D7 provides a recirculation path for residual energy in the inductor 18 at the end of the discharge phase 6 in order to recirculate to the first capacitor C1 via the diode D8 associated with the charge switch Q1.

Figure 5:
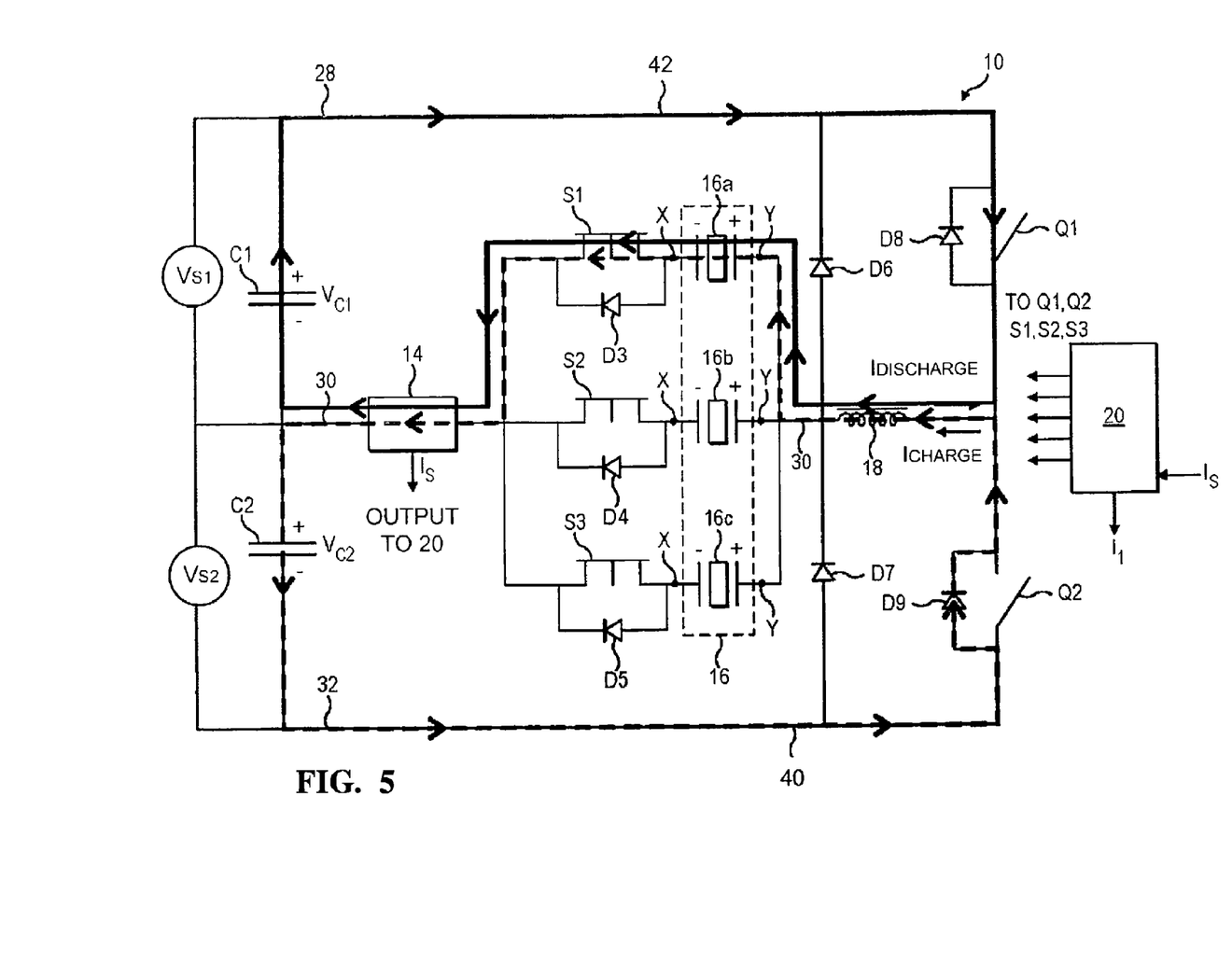
FIG. 5 is the circuit diagram of FIG. 3 showing the current paths around the drive circuit during a charge phase.

At the appropriate time, the stack 2 of the selected injector 16a will be charged in order to close the injector to cease fuel delivery by varying the charge current between the upper and lower threshold levels, $I_3$, $I_4$, depending on the primary closing current set-point. Charging of the stack will not be described in detail here and can be found in the Applicant's co-pending application no. EP1860307.

The varying current is driven through the stack 2 until the primary closing time PCT expires. In this charging phase 8, the first capacitor C1 provides energy and the second capacitor C2 receives energy for storage. At the end of the primary closing time PCT (charge time), the charge switch Q1 and the select switch S1 of the injector 16a are deactivated.

Generally, it is not critical at the end of the charge phase 8, as it is at the end of the discharge phase 6, whether the injector select switch S1, S2, S3 or charge switch Q1 is deselected first. This is because at the end of the primary closing time PCT, the stack 2 is effectively charged to its initial high voltage level and so, as a result, there can be only a minimal amount of current flowing (it is not possible to charge the stack 2 indefinitely due to its capacitive nature). This means that it is not possible to apply more charge than intended and ensures that the stack 2 is recharged to a known state prior to the subsequent discharge.

There is a closed loop system, which does not form part of the present invention, that operates to keep the voltage across the stack between injections at the high voltage level. Therefore, at the start of any discharge phase the stack is always at a known reference voltage.

It is to be appreciated that there are other ways in which the injectors 16a, 16b, 16c may be charged. For example, it is possible to charge the injectors 16a, 16b, 16c without activating their injector select switches S1, S2, S3 since the diodes D3, D4 and D5 across the injector select switches S1, S2, S3 ensure that current can flow in the direction to charge the stack 2 fully when only the charge switch Q1 is activated (closed).

Figure 6:
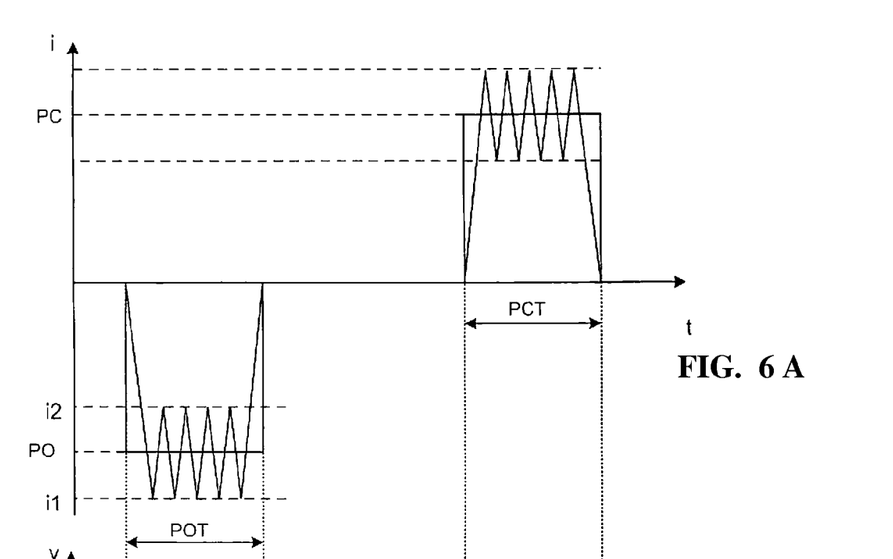

FIG. 6a shows a typical graph of current versus time for a discharge phase in accordance with the known piezoelectric actuator activation technique as described above. The discharge phase includes a single, substantially constant, rate of discharge and the discharge current oscillates between the upper and lower current threshold levels $I_1$, $I_2$, which are dictated by the constant current set point PO, for a primary opening time POT.

FIG. 6b shows the voltage that is stored on the piezoelectric stack as it decreases from a fully charged level V0 to a discharged level V1 due to the charge that is being driven out of the stack during the discharge phase.

FIG. 6c shows the injection rate of fuel that is injected from the piezoelectric injector during a first opening portion of an injection event. Following commencement of the discharge phase, the injection rate only begins to increase after a short delay, shown as 'D' in FIG. 6c and hereafter referred to as the "start of injection delay". The start of injection delay, D, occurs due to the finite period of time for the movement of the actuator to be transmitted to the valve needle of the injector. Following the start of injection delay, D, the injection rate rises with an approximately constant gradient to a peak value $Q_{PK}$.

As is also shown in FIGS. 6a, 6b and 6c, note that after a predetermined period of time, a charge phase is commenced, as described above, which adds charge to the piezoelectric stack and, thus, reduces the injection rate to zero thereby terminating the injection event. During the charge phase, the stack is charged with a current that oscillates above an average charging current set point PC for a primary closing time PCT.

It has been found that one way in which to decrease the rate at which fuel is injected during needle lift is to reduce the current set point PO, thereby reducing the rate at which the stack discharges. A reduction in the gradient of the injection rate may be desirable to control certain aspects of the combustion process, for example, in order to reduce noise or exhaust smoke emissions. However, the Applicant has found that merely reducing the current set point with which the piezoelectric actuator is discharged is undesirable as it increases the variation of fuel volume that is delivered by the injector from one injection event to another. It also has the disadvantage that it increases the change in injector performance over its lifetime.

Figure 7A:
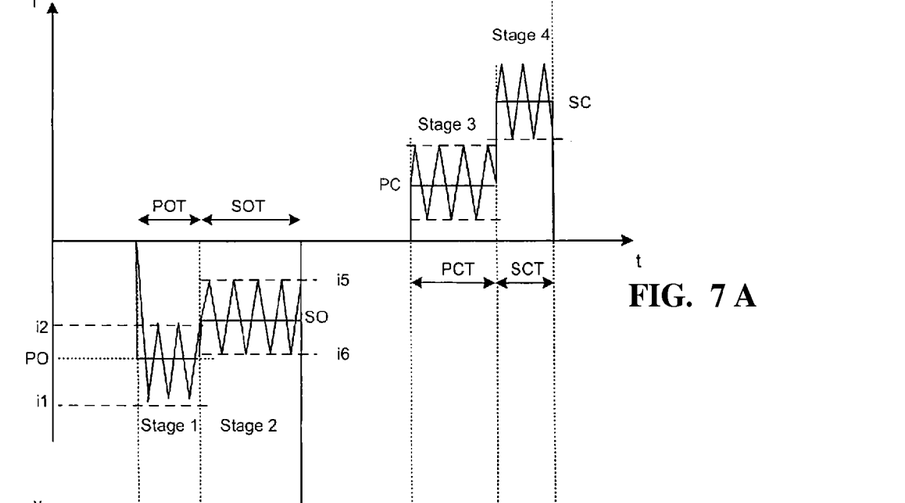
FIG. 7a is a graph of current versus time for an embodiment of the invention, and showing (i) first and second opening stages and (ii) first and second closing stages.
Figure 7B:
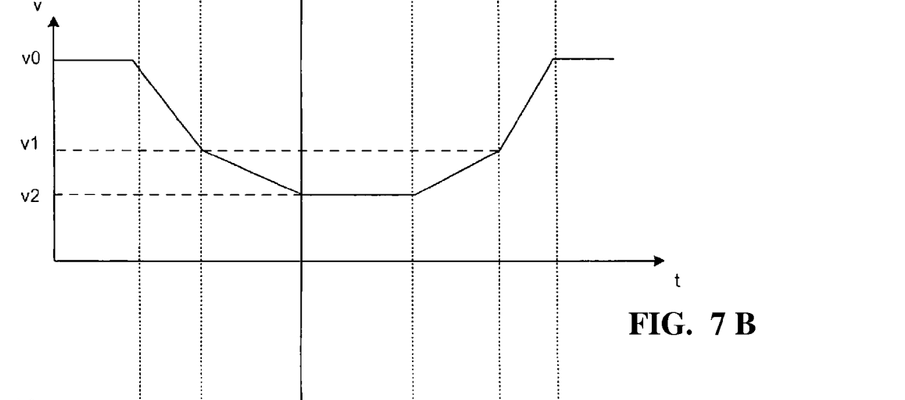
Figure 7C:
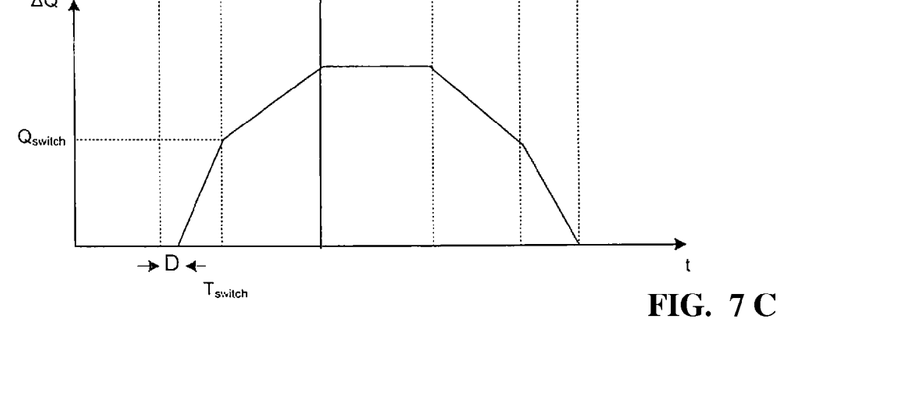
FIG. 7c is a graph of injection rate versus time according to FIGS. 7a and 7b.

An embodiment of the invention that addresses the above problems is depicted in FIGS. 7a, 7b and 7c and is implemented using the control circuit 10 described above with reference to FIGS. 2 to 5. FIG. 7a shows a graph of current versus time for a discharge phase which includes two distinct stages, Stage 1 and Stage 2. Each stage has a different discharge rate, that is to say, a different current set point. A charge phase, including Stage 3 and Stage 4, is also shown, again with each stage having a different charge rate.

During Stage 1, the piezoelectric actuator is driven with a primary opening current set point PO for a primary opening time POT, as described above. During Stage 2, which follows immediately from Stage 1, the actuator is driven with a secondary opening current set point SO for a secondary opening time SOT. The secondary opening current set point SO and the secondary opening time SOT are derived in much the same way as the primary opening current set point PO and the primary opening time POT detailed above. The ECM determines the required fuelling and timing of injection pulses based on the current engine operating conditions, including torque, engine speed and operating temperature, and inputs the required values to the microprocessor 20. The microprocessor 20 then refers to look up tables stored in its memory in order to apply appropriate values of primary opening current set point PO and secondary opening current set point SO for the appropriate time periods in order to generate the demanded fuelling dictated by the ECM.

Stage 1 is an initial driving stage in which the actuator is discharged with a high current in order to impart a relatively large initial lift force to the valve needle. This has the effect of keeping the start of injection delay D at an acceptable level, and substantially consistent from one injection event to another and over injector lifetime. During Stage 1, the discharging current (corresponding to the primary opening current set point PO and the upper and lower thresholds $I_1$ and $I_2$) is driven through the stack 2 for the primary opening time POT. This causes the stack voltage to reduce from V0 to V1, which forces the valve needle to lift accordingly.

Immediately after Stage 1, Stage 2 commences during which the microprocessor 20 drives current out of the stack 2 at the reduced second current set point SO (corresponding to the upper and lower thresholds $I_5$ and $I_6$), causing the charge on the stack 2 to decrease further from V1 to V2, but at a reduced rate than during Stage 1. Since the voltage on the stack 2 decreases from V1 to V2, the valve needle lifts further away from its seat, accordingly. So, during Stage 2, the stack 2 is discharged at a lower rate than during Stage 1 but still at a rate which is sufficient to generate movement of the valve needle to increase the injection rate more slowly than for Stage 1.

In the embodiment of FIGS. 7a, 7b, and 7c, the point at which the ECM switches between the primary opening current set point PO and the secondary opening current set point SO occurs at the point at which the injection rate has reached about 50% of its peak value, which is shown on FIG. 7c as $Q_{switch}$. This injection rate threshold value corresponds to a primary opening time value labelled as $T_{switch}$. The specific timings are determined empirically during system testing and stored in the aforementioned look up tables in the microprocessor 20. Thus, in addition to storing values of the primary opening current set point PO, the primary opening time POT, and the primary closing current set point PC, the memory of the microprocessor 20 also stores look up tables with corresponding values of the secondary opening current set point SO, and the secondary opening time SOT.

It should be appreciated that whether or not the microprocessor 20 is required to discharge the stack using just the primary opening current set point PO, or both the primary opening current set point PO and the secondary opening current set point SO, is dependant on the fuel delivery volume that is demanded for an injection event. The maximum duration of the primary opening time POT is limited to that time period in which the fuel injection rate reaches 50 percent of the peak injection rate. Therefore, for relatively small injection events for which the injection rate does not exceed 50 percent of the peak injection rate $Q_{switch}$, the microprocessor 20 will determine only a value of a primary opening current set point PO and a value of a primary opening time POT and output the appropriate upper and lower current thresholds to the current sensing and control means 14 in order to control the drive circuit 10. Such injection events that may only require a Stage 1 discharge phase, but no Stage 2, are small volume injections such as pilot injection events and main injection events during engine idle operating conditions.

However, if the fuel demand is relatively large, such that the injection rate will exceed the 50 percent peak injection rate $Q_{switch}$, the microprocessor 20 also outputs a secondary current set point SO and a secondary opening time SOT to the current sensing and control means 14 to drive the drive circuit 10.

FIG. 7*a* also shows the closing phase during which the injector is driven with a primary closing current PC for a primary closing time PCT (Stage 3), following by a higher, secondary closing current SC for a secondary closing time SCT (Stage 4). For the closing phase, the charge on the stack 2 increases from V2 to V1 during Stage 3, and increases again from V1 to V0 during Stage 4, but with the rate of increase in charge being greater during Stage 4 than during Stage 3. The result is that the injection rate is lower during the initial closing stage compared with the latter closing stage, as shown in FIG. 7*c*.

Variations on the above are possible without departing from the inventive concept as defined by the appended claims. For example, although the fuel delivery system as described above has been with specific reference to a "discharge to inject" type injector, it should be appreciated that the same principles apply to a "charge to inject" injector.

Furthermore, it should be appreciated that whilst the Applicant has found that limiting the primary opening time POT and the primary opening current set point PO to such values as to increase the injection rate to only 50 percent of the peak injection rate, other values are also applicable. For example, advantages will also be gained if the injection rate threshold value is less than 60 percent and, preferably between 30 and 60 percent. More preferably the injection rate threshold is selected to be between 45 and 55 percent, and still more preferably, between 48 to 52 percent.

In a further embodiment, the injection rate threshold value is selected in response to, and as a function of, the pressure of fuel being supplied to the injector from, for example, a common rail fuel volume. It should be appreciated that in such a case, the injection rate threshold values corresponding to a range of fuel pressures could be determined empirically and stored in a data map in the memory of the microprocessor 20. Alternatively, the injection rate threshold values could be calculated in real time based on a predetermined model.

In the embodiment described with reference to FIGS. 7*a*, 7*b* and 7*c*, it should be noted that the secondary opening time SOT is greater than the primary opening time POT. The benefit of this feature is that, after the initial high opening force exerted on the valve needle during the first opening stage, the valve needle experiences a relatively low lifting force for a longer duration during the secondary opening phase. This reduces the lift speed of the needle and has a beneficial effect on shaping the delivery rate characteristic to optimise combustion.

It should be noted that combustion efficiency advantages are obtained if the secondary opening time is made to be significantly greater than the primary opening time. In order to take advantage of a relatively short primary opening time, to maintain aged injector performance, the second opening phase may be made relatively long to bring the valve needle up to full lift, and therefore full injection rate in a stable manner. Although not explicitly shown in the figures, it is predicted that the greatest efficiency gains are achievable with ratios of secondary opening phase to primary opening phase in the range of between about 4:1 and 6:1 depending on rail pressure.

Although it is described above that Stage 2 follows immediately from Stage 1, in a further embodiment (not shown in the figures) a temporal delay is introduced between the Stage 1 and the Stage 2 discharging steps. Introducing such a delay may provide benefits in terms of reducing combustion noise. The same applies to the closing phase of injection, so that Stage 4 need not necessarily follow immediately after Stage 3.

The invention claimed is:

1. A method for controlling the displacement of a stack of a piezoelectric actuator adapted for use in a fuel injector in order to control the fuel injection rate and volume, the method comprising;
    driving a varying current through the stack during an opening phase including a first opening stage and a second opening stage; the method further including:
    driving the stack during the first opening stage with a first opening current level for a first opening time period and driving the stack during the second opening stage with a second opening current level for a second opening time period;
    wherein the second opening current level is less than the first opening current level and the current levels are selected so that the fuel injection rate in the opening phase includes a first portion corresponding to the first opening stage having a gradient that is steeper than a second portion corresponding to the second opening stage.

2. The method of claim 1, wherein the second opening time period is longer than the first opening time period.

3. The method of claim 1, wherein there is a delay between the end of the first opening stage and the start of the second opening stage.

4. The method of claim 1, further including driving a varying current through the stack during a closing phase including a first closing stage and a second closing stage; wherein the stack is driven during the first closing stage with a first closing current level for a first closing time period and is driven during the second closing stage with a second closing current level for a second closing time period, and wherein the second closing current level is greater than the first closing current level and the current levels are selected so that the injection rate in the closing phase includes a first portion corresponding to the first closing stage having a gradient that is less steep than a second portion corresponding to the second closing stage.

5. The method of claim 4, wherein there is a delay between the end of the first closing stage and the start of the second closing stage.

6. The method of claim 1 wherein, during the first stage, the stack is driven such that the first opening time period is less than or equal to a predetermined injection rate threshold value (Tswitch).

7. The method of claim 6, wherein the predetermined injection rate threshold value (Tswitch) is selected such that the injection rate reached during the first opening stage is less than about 60% of a peak injection rate of the injector.

8. The method of claim 6, wherein the predetermined injection rate threshold value (Tswitch) is selected such that the injection rate reached during the first opening stage is between 30% and 60% of a peak injection rate of the injector.

9. The method of claim 6, wherein the predetermined injection rate threshold value (Tswitch) is selected such that the injection rate reached during the first opening stage is substantially equal to 50% of a peak injection rate of the injector.

10. The method claim 6, wherein the injection rate threshold value is selected as a function of the pressure of fuel that is supplied to the fuel injector.

11. The method of claim 1, wherein the piezoelectric actuator is adapted for use in a discharge-to-inject fuel injector.

12. A method for controlling the displacement of a stack of a piezoelectric actuator adapted for use in a fuel injector in order to control the fuel injection rate and volume, the method comprising;
- driving a varying current through the stack during an opening phase;
- driving a varying current through the stack during a closing phase including a first closing stage and a second closing stage; wherein the stack is driven during the first closing stage with a first closing current level for a first closing time period and is driven during the second closing stage with a second closing current level for a second closing time period, and wherein the second closing current level is greater than the first closing current level and the current levels are selected so that the injection rate in the closing phase includes a first portion corresponding to the first closing stage having a gradient that is less steep than a second portion corresponding to the second closing stage.

13. A method for controlling the displacement of a stack of a piezoelectric actuator adapted for use in a fuel injector in order to control the fuel injection rate and volume, the method comprising;
- driving a varying current through the stack during an opening phase including a first opening stage and a second opening stage;
- driving the stack during the first opening stage with a first opening current level for a first opening time period and driving the stack during the second opening stage with a second opening current level for a second opening time period;
- wherein the second opening current level is less than the first opening current level and wherein, during the first stage, the stack is driven such that the first opening time period is less than or equal to a predetermined injection rate threshold value (Tswitch).

14. The method of claim 13, wherein the predetermined injection rate threshold value (Tswitch) is selected such that the injection rate reached during the first opening stage is less than about 60% of a peak injection rate of the injector.

15. The method of claim 13, wherein the predetermined injection rate threshold value (Tswitch) is selected such that the injection rate reached during the first opening stage is between 30% and 60% of a peak injection rate of the injector.

16. The method of claim 13, wherein the predetermined injection rate threshold value (Tswitch) is selected such that the injection rate reached during the first opening stage is substantially equal to 50% of a peak injection rate of the injector.

* * * * *